United States Patent [19]

Meredith

[11] Patent Number: 5,369,250
[45] Date of Patent: Nov. 29, 1994

[54] METHOD AND APPARATUS FOR UNIFORM MICROWAVE HEATING OF AN ARTICLE USING RESONANT SLOTS

[75] Inventor: Roger J. Meredith, Rutland, England

[73] Assignee: APV Corporation Limited, London, United Kingdom

[21] Appl. No.: 950,953

[22] Filed: Sep. 25, 1992

[30] Foreign Application Priority Data

Sep. 27, 1991 [GB] United Kingdom ............... 9120589.8
Mar. 20, 1992 [GB] United Kingdom ............... 9206162.1

[51] Int. Cl.$^5$ ........................... H05B 6/72; H05B 6/78
[52] U.S. Cl. ..................................... 219/691; 219/693; 219/696; 219/748; 219/750; 426/243; 99/451; 422/21
[58] Field of Search ................. 219/10.55 A, 10.55 F, 219/10.55 R, 10.55 E, 10.55 M, 690, 691, 693, 696, 697, 748, 750; 426/234, 243; 99/451, DIG. 14; 422/21

[56] References Cited

U.S. PATENT DOCUMENTS

| 3,263,052 | 7/1966 | Jeppson et al. | 219/10.55 A |
|---|---|---|---|
| 3,474,209 | 10/1969 | Parker | 219/10.55 A |
| 3,622,732 | 11/1971 | Williams | 219/10.55 A |
| 3,980,855 | 9/1976 | Boudouris et al. | 219/10.55 A |
| 4,160,145 | 7/1979 | Rueggeberg | 219/10.55 F |
| 4,210,793 | 7/1980 | Fournet-Fayas | 219/10.55 F |
| 4,476,363 | 10/1984 | Berggren et al. | 219/10.55 A |
| 4,908,486 | 3/1990 | Fry | 219/10.55 A |
| 4,956,530 | 9/1990 | Koch | 219/10.55 A |
| 4,956,532 | 9/1990 | Koch | 219/10.55 A |
| 4,962,298 | 10/1990 | Ferrari et al. | 219/10.55 A |

FOREIGN PATENT DOCUMENTS 0269073  6/1988  European Pat. Off. .
WO9111894  8/1991  WIPO .

OTHER PUBLICATIONS

Risman, *A Commercial Microwave Oven Using A Near Field Applicator*, 1974, pp. 163–167.

*Primary Examiner*—Philip H. Leung
*Attorney, Agent, or Firm*—Quarles & Brady

[57] ABSTRACT

In the heat treatment of food particularly pre-packed food it is important to control the temperature and to provide uniform heat distribution within the article, By using a number of microwave emission slots in a waveguide which are brought to resonance in the presence of pre-packed articles carried over the slots by a conveyor the rate of rise of temperature within the article is controlled without unnecessary energy loss between articles carried seriatim on the conveyor The slots may be set obliquely to the direction of passage of the article Alternatively the slots may be formed by a series of smaller slots staggered obliquely across the waveguide so that the presence of the article tunes each of the slots in turn as it passes over the waveguide. The slots may be covered with low-loss dielectric material to prevent extraneous matter falling into the slots and to space the article from the slots so as to control power dissipated.

17 Claims, 3 Drawing Sheets

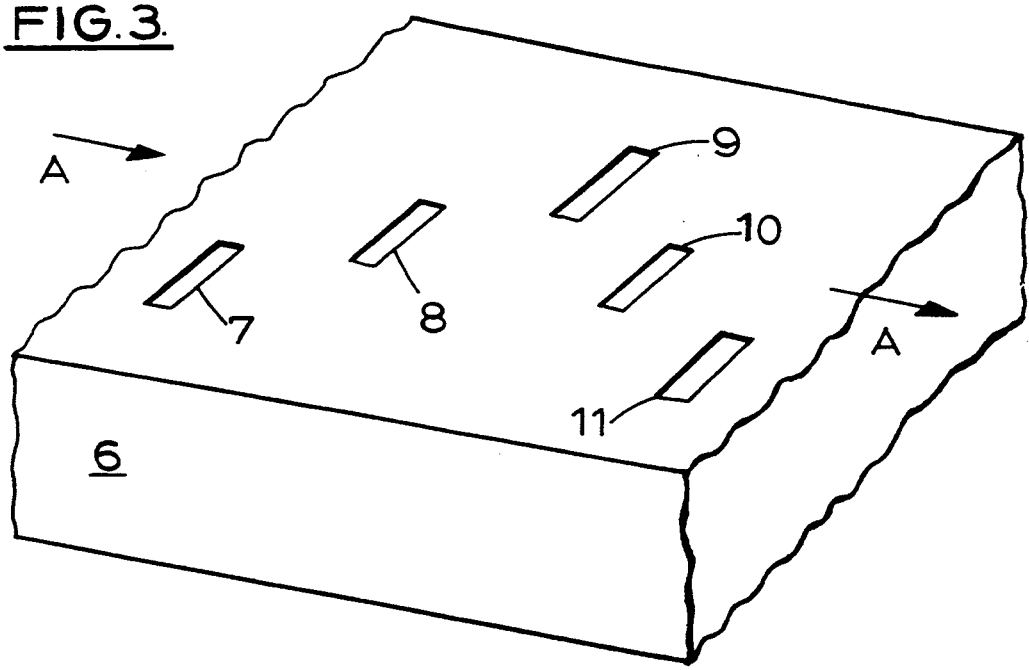
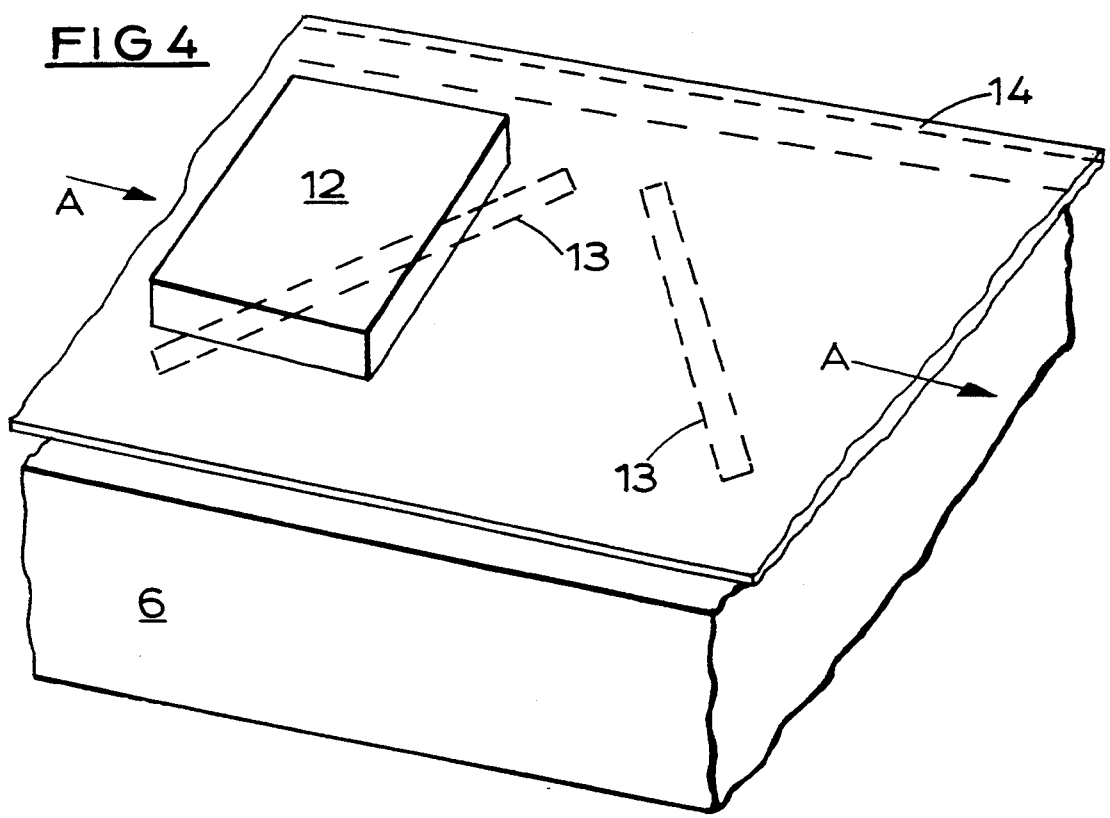

METHOD AND APPARATUS FOR UNIFORM MICROWAVE HEATING OF AN ARTICLE USING RESONANT SLOTS

The present invention relates to improvements to microwave heating devices. The invention relates particularly, but not exclusively, to heating devices for heating food, particularly pre-packed food passing in a stream through the heating device.

BACKGROUND TO THE INVENTION

Microwave ovens are well-known for the rapid volumetric heating of food. A common problem encountered with microwave heating is the lack of uniformity of heating particularly on the edges and corners of solids.

In large scale continuous food production, uniformity of heating and the control of temperature is very important, particularly where the food is to be processed to kill bacteria in, for example, pasteurisation or sterilisation treatment. Commonly individual meals in boxes (chill foods) or rectangular blocks of wrapped food product are passed through a microwave processing oven on a conveyor belt which is transparent to the microwaves.

The present invention seeks to provide a means of heating articles, such as food products, so that there is substantially uniform heating. The invention also seeks to enable a train of articles, such as discretely wrapped solids, to be subjected to microwave energy concentrated in the discrete articles and not in the gaps within the article train. The invention also seeks inherently to control the energy dissipated in the leading and trailing edges of the solid articles in the train so as to provide substantially uniform heating throughout the article.

The invention therefore seeks to provide a method and means for controlling the temperature, for achieving substantially uniform heat distribution, and for controlling the rate of rise of temperature in the article without unnecessary energy loss between articles in a train of articles to be processed.

SUMMARY OF THE INVENTION

According to one aspect of the invention we provide a microwave heating device for heating an article of predetermined dimensions and predetermined dielectric properties, the device comprising a microwave emission slot, a microwave generator arranged to excite the slot, conveying means for moving the article on a predetermined path past the slot for subjecting the article, in use of the device, to the microwave field emanating from the slot, characterised in that the slot is dimensioned such that in use the moving article conveyed by the conveying means along said path tunes the slot substantially to resonance at the frequency or principal frequency of the microwave generator, when the article is in close proximity to the slot.

According to a second aspect of the invention we provide a method of heating an article by passing the article through a microwave heating device, the heating device containing at least one microwave emission slot arranged adjacent to means for moving the article through the microwave field emanating from the slot, characterised in that the presence of the moving article in close proximity to the slot tunes the slot substantially to resonance at the microwave excitation frequency.

Preferably the slot is located in the longer side wall of a rectangular waveguide. However, the slot may be located in one of the plates of a parallel plate transmission line. The slots may be staggered across the width of the waveguide and/or inclined at an angle to the direction of travel of the articles to be heated.

The slot or slots may be covered with a low-loss dielectric material to space the article from each slot so as to control the power dissipated in the article and to prevent extraneous matter falling into the slots.

A low-loss dielectric conveyor can be used to move the article past the slot or slots.

The length and width of each slot are set according to the desired resonant frequency. It is not necessary to space the slots equally or for them to be inclined at the same angle of inclination to the direction of the article over the slots.

BRIEF DESCRIPTION OF THE DRAWINGS

The invention will now be described by way of example with reference to the accompanying diagrammatic drawings in which:

FIG. 3 shows a conveyor arrangement with a rectangular waveguide having a series of slots as shown in FIG. 1, FIG. 4 shows a conveyor having a low-loss dielectric and complementary obliquely orientated slots.

Referring now to the drawings: FIG. 1 shows a section 1 of the longer wall of a rectangular waveguide, or the plates of a parallel-plate transmission line, having an oblong rectangular slot therein. FIG. 2 shows the equivalent electrical circuit of FIG. 1 and consists of a resistor 3, inductor 4 and capacitor 5 in parallel forming a resonant circuit.

Figure 6:
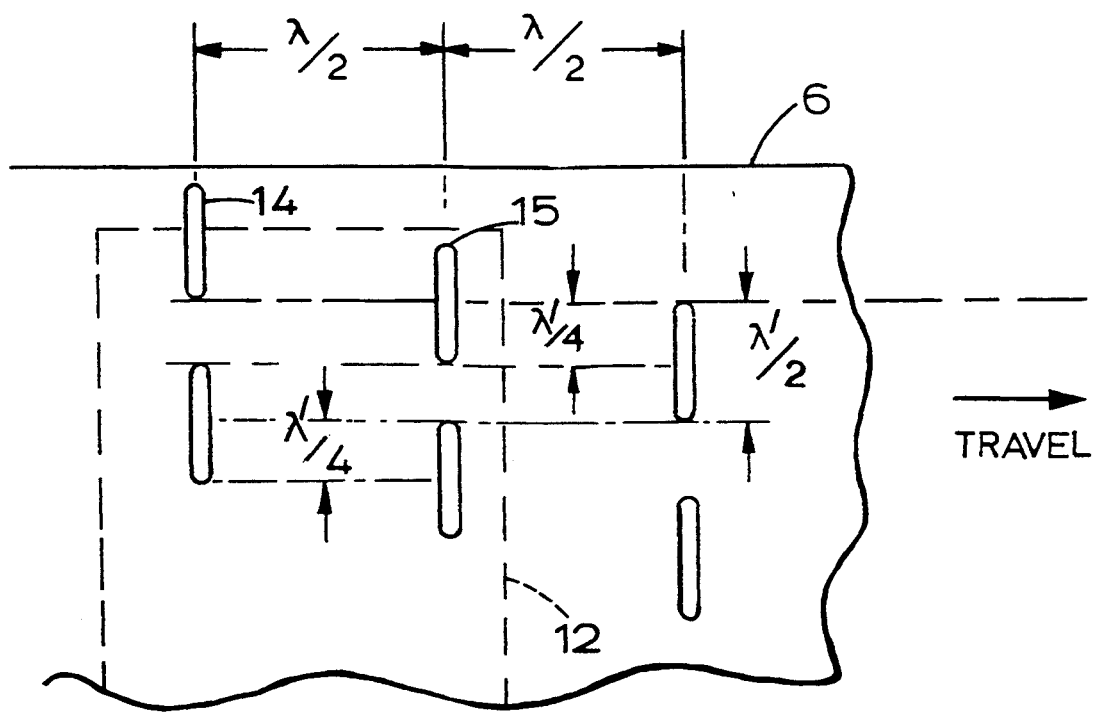
FIG. 6 shows in plan view one arrangement of staggered slots in a waveguide.

The invention will be described theoretically before the practical embodiments shown in FIGS. 3, 4 and 6 are described.

Food contains a high proportion of water. Water has a high dielectric constant $E'$, in the range 50–85, depending on temperature, so that food containing water provides a dielectric constant typically in the range $E' = 10$ to 50, depending on temperature and moisture content.

Figure 1:
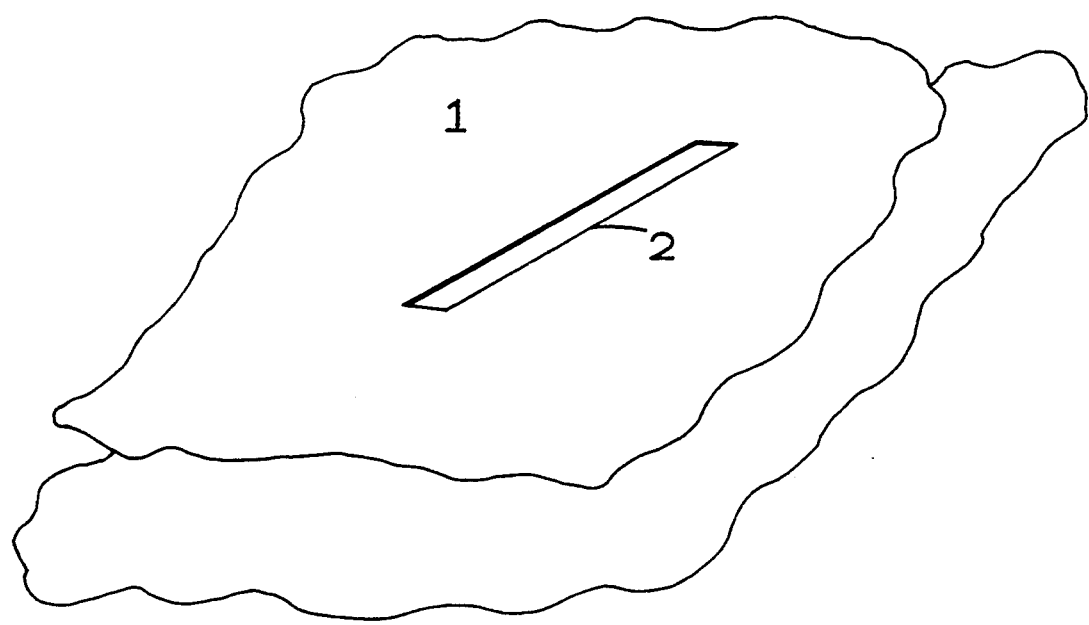
FIG. 1 shows a transmission port in a parallel-plate transmission line.
Figure 2:
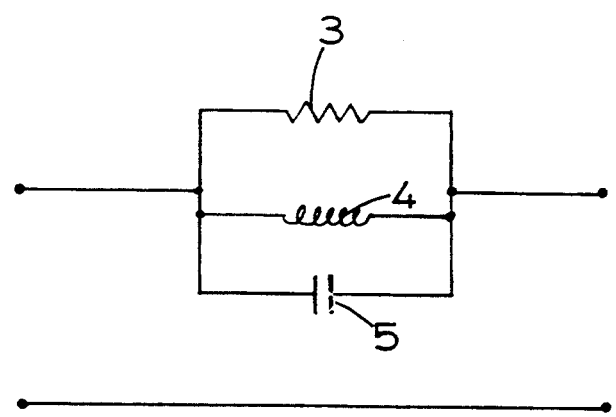
FIG. 2 shows the equivalent circuit representation of FIG. 1.

A simple form of microwave radiating element consists of a slot in the wall of a microwave waveguide, or a slot in one of the plates of a parallel-plate transmission line, both of which are represented by FIG. 1. According to the dimensions of the slot it will provide a resonant circuit at a predetermined frequency. The electrical equivalent of the resonant circuit is shown in FIG. 2 in which the capacitance is quantified by the distance between the longer sides of the slot and the inductance is quantified by the length of the slot. Resonance occurs when the susceptance of the inductance and capacitance are equal and opposite, then the input admittance of the slot is represented by the conductance of the resistor 3. At the excitation frequency resonance occurs when the slot is electrically a multiple of one half of a wavelength long when coupled to the dielectric immediately adjacent to the slot.

The resonant frequency will be different for materials of different dielectric properties that are positioned in the vicinity of the slot because the capacitance value will vary. Generally articles to be heated in a microwave oven are non-magnetic and hence there is no significant effect upon the inductance. The variation in resonant frequency is therefore related solely to the dielectric within the field emanating from the microwave slot.

It is well-know that for a given frequency of microwave radiation the wavelength is reduced when the field enters a dielectric material of high dielectric constant. Thus at a microwave frequency of, for example, 2450 MHz, where the free-space wavelength is 122.36 mm, in a dielectric medium with a permittivity of 20, the wavelength would be $122.36 \div \sqrt{20} = 27.36$ mm.

The practical effect of this is that food having a dielectric permittivity of 20, when subject to microwave energy with a frequency of 2450 MHz emanating from a rectangular port having a length of 27.36 mm dissipates energy in the form of heat as it forms the dielectric in the resonant circuit. Because the material to be heated is not totally within the slot the free-space wavelength is reduced by an amount less than the theoretical reduction calculated above. Thus a loaded resonant half-wave slot would be, for example, 45 mm long, whereas unloaded its length would be 61.2 mm long. Thus, an effective wavelength $\lambda' = 90$ mm applies to the loaded resonant half-wave slot.

A slot 45 mm long would therefore be substantially non-resonant when unloaded and excited at 2450 MHz, so that it would constitute a high susceptance and therefore very little power would radiate from it. As a dielectric solid is brought within the vicinity of the slot it will be 'pulled' into resonance and the radiated power from the slot will greatly increase. This radiated power will dissipate as heat within the load.

In order to reduce the lack of uniformity of heating the article to be heated may be moved obliquely into the influence of the slot. This will gradually bring the slot into full resonance and so the leading edge of the solid to be heated will not be subjected to the full power output of the slot. The full power output is only achieved when the solid covers the slot and full resonance is achieved. The rate of decrease of power is also gradual as the trailing edge of the block of solid to be heated gradually leaves the influence of the slot.

It will be appreciated that to achieve uniform heating transversely a plurality of slots will usually be required. If the article to be heated is on a conveyor travelling at constant velocity then the slots can be spaced apart longitudinally in the direction of travel as well as transversely across the conveyor.

Alternatively oblong-rectangular articles to be heated can be set obliquely on the conveyor passing over orthogonally set ports so that they gradually enter the influence of each slot.

When the waveguide or transmission lines contain a standing wave the longitudinal spacing of the slots is preferably such that the slots are substantially at the nodes of the standing waves.

Referring now to FIG. 3 which shows a waveguide 6 having slots 7, 8, 9, 10 and 11 spaced along the length of the waveguide and staggered across the width. The article to be heated is progressed over the top of the slots in the direction of the arrows A—A. An alternative arrangement of slots is shown in FIG. 4 in which the slots are oriented at a chosen angle, for example 45°, to the direction of travel of the solid articles to be heated. By this means the rate of change of resonant frequency as the article, illustrated by the oblong-rectangular, in plan, box 12, covers a slot 13, is reduced so that full power is not radiated and dissipated as heat in the article 12 until the leading edge has already passed over most of the slot length. This therefore reduces the tendency to overheat the leading edge and similarly as the article leaves the influence of the slot 13 the rate of change of resonant frequency decreases as the trailing edge leaves the influence of the slot. It will be appreciated that to achieve uniform heating transversely a plurality of slots may be required.

Figure 5:
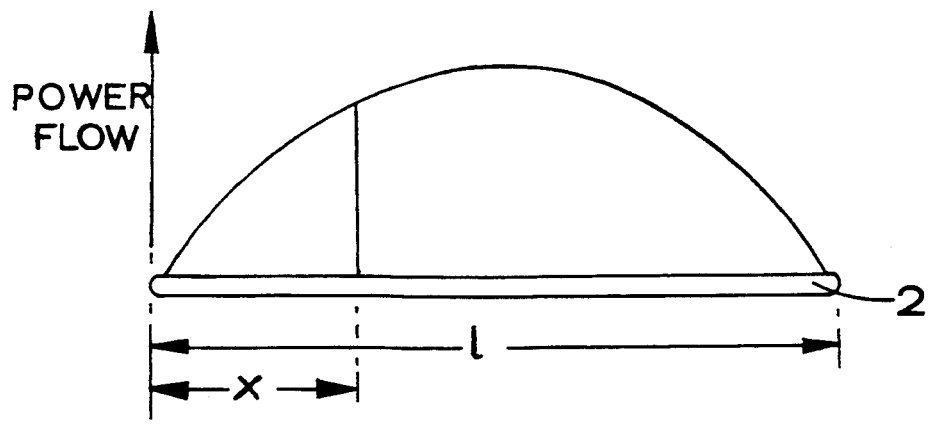
FIG. 5 shows the distribution of microwave energy emitted from a slot.

It is well known that half-wavelength resonant slots exhibit a sinusoidal distribution of electric field strength along their length as depicted in FIG. 5. As the heat dissipated in the article is proportional to the square of the field strength then the heat distribution along the length is proportional to $$\sin^2 \frac{(\pi x)}{(l)}$$

where
$l$ = length of the slot
$x$ = distance from the end of the slot to the observation plane.

Because mathematically $\cos^2 \emptyset + \sin^2 \emptyset = 1$, it is clear that by appropriate choice of the transverse distribution of slots, for example as shown in FIG. 6, it is possible to interleave a set of slots to give substantially uniform heating across an article.

With reference to FIG. 6, when a food product 12 passes successively over slots 14 and 15, that portion of the product 12 which is subjected to the heating effect of both slots 14 and 15 will receive a substantially uniform net heating due to the $\sin^2 + \cos^2$ summation of the radiations from slots 14 and 15. The slots 14 and 15 are displaced transversely $$\frac{l}{2} = \frac{\lambda'}{4}$$

The successive slots 14 and 15 are preferably spaced longitudinally of the waveguide by a distance $$\frac{\lambda}{2}$$

when the wave guide contains a standing wave, whereby the slots are arranged substantially at the nodes of the standing wave, for maximum coupling with the slots.

In a practical embodiment of the invention the slots are cut in the broad face of the rectangular waveguide as shown in FIGS. 3 and 4. In FIG. 4, instead of staggering slots as in FIGS. 3 and 5, the slots 13 are arranged to be inclined at an acute angle to the direction of travel A of the article to be heated, and successive slots are preferably arranged to be so inclined in opposite directions.

It is possible that the waveguide could be replaced by a parallel plate transmission line to feed power to the slots or by a coaxial line.

As shown in FIG. 4 a conveyor 14 is arranged to transport the article 12 over the slots 13. The conveyor 14 may slide directly on the upper surface of the waveguide, but the conveyor 14 can be made adjustable to enable the distance between the article and the slots to be adjusted by a few millimeters according to the dielectric constant of the load article to obtain resonance at the slots.

The conveyor 14 is preferably a low-loss dielectric material. If a conveyor is not used the surface of the waveguide containing the slots or the individual slots may be provided with a stationary low-loss dielectric material, such as alumina, to act as a microwave window and still prevent any extraneous material from entering the waveguide.

The slots can be filled or covered with a slab of dielectric material of dielectric constant and thickness to provide an improved impedance match between the characteristic impedance of the load and the effective source impedance of the slot. In principle such a slab is a quarter-wave matching transformer but satisfactory performance can be achieved with dimensions differing substantially from the ideal.

Typical dimensions of pre-packed food products for heating by the equipment described above are as follows:

| | |
|---|---|
| 140 mm × 115 mm × 35 mm high | 115 mm dia × 40 mm high |
| 160 mm × 120 mm × 35 mm high | 110 mm dia × 23 mm high |

It will be appreciated that the embodiments described may be adapted to a number of situations and the waveguide need not be in a single direction but could be curved.

It is possible in accordance with the invention to provide the articles to be heated on a circular conveyor which transports the articles over a slotted waveguide.

If a parallel-plate transmission line is used to feed the slots then an array of posts between the plates may be configured to control undesired high-order mode generation.

Instead of employing a single microwave generator it is envisaged that more than one generator may sometimes be used.

It will be appreciated that the invention is applicable to microwave frequencies other than 2450 MHz, such as 915 MHz.

I claim:

1. A method of heating an article having a known dielectric value using microwave energy, said method comprising:
    providing a microwave emission means formed with at least one microwave emission slot for emitting microwave radiation;
    exciting said microwave emission means with a microwave generator capable of producing microwave radiation at a microwave excitation frequency;
    dimensioning said slot such that when said article of known dielectric value is placed in a close proximal position adjacent to said slot along an outer portion of said microwave emission means, the dielectric nature of the article tunes said slot substantially to resonance at said microwave excitation frequency, which results in coupling of microwave radiation between said article and said slot, said slot being substantially out of tune when said article is moved away from said slot;
    transporting said article to be heated on a transport means along a predetermined path in a direction of travel so that said article is first moved into said close proximal position and is then transported away from said slot.

2. A method as claimed in claim 1 wherein said slot has a length such that said slot is resonant in the half wavelength mode when loaded with the dielectric value of said article in said close proximal position.

3. A method as claimed in claim 2 wherein said slot has a longer side, and said path is directed such that said longer side intersects the direction of said article as said article passes through said close proximal position.

4. A method as claimed in claim 3 wherein said direction of said article intersects said longer side of said slot obliquely.

5. A method as claimed in claim 1 wherein said microwave emission means is formed with a plurality of slots.

6. A method as claimed in claim 5 wherein said slots are set at a plurality of differing angles to said direction.

7. A method as claimed in claim 5 wherein said slots are staggered laterally relative to said direction of travel of said article through said close proximal position.

8. A method as claimed in claim 1 wherein said microwave emission means comprises an electrically conductive sheet forming a microwave transmission line, said slot being formed in said sheet.

9. A method as claimed in claim 1 wherein said microwave emission means comprises a microwave cavity formed with said slot.

10. A method as claimed in claim 1 wherein said slot is energised by a plurality of microwave sources of energy.

11. A method as claimed in claim 1 wherein a dielectric sheet extends across said slot.

12. A method as claimed in claim 11 wherein said sheet has a thickness of about ¼ free space wavelength of said microwave radiation divided by the square root of the dielectric constant of said sheet.

13. A method as claimed in claim 11 wherein said dielectric is alumina.

14. A method as claimed in claim 1 wherein said transport means comprises a conveyor of low-loss dielectric material.

15. A method as claimed in claim 1 wherein said article comprises edible material.

16. A method as claimed in claim 15 wherein said article comprises a plastics tray containing said edible material.

17. A microwave heating device for heating an article of predetermined dimensions and predetermined dielectric properties, said device comprising:
    a microwave emission means formed with at least one microwave emission slot,
    a microwave generator coupled to said microwave emission means and arranged to excite said microwave emission means with microwave radiation at a microwave excitation frequency,
    transport means for moving the article on a predetermined path, at least one portion of said path being arranged such that said article is carried to a proximal position adjacent to said slot along an outer portion of said microwave emission means, said proximal position not being enclosed within a resonant cavity, and
    said slot having a length and width such that when said microwave generator excites said microwave emission means, said slot is tuned substantially to resonance at the microwave excitation frequency of said microwave generator by action of intended load in the form of said article to be heated, when said article is in said proximal position.

* * * * *